No. 653,226. Patented July 10, 1900.
W. T. FORBES.
BALE TIE.
(Application filed Oct. 9, 1899.)
(No Model.)
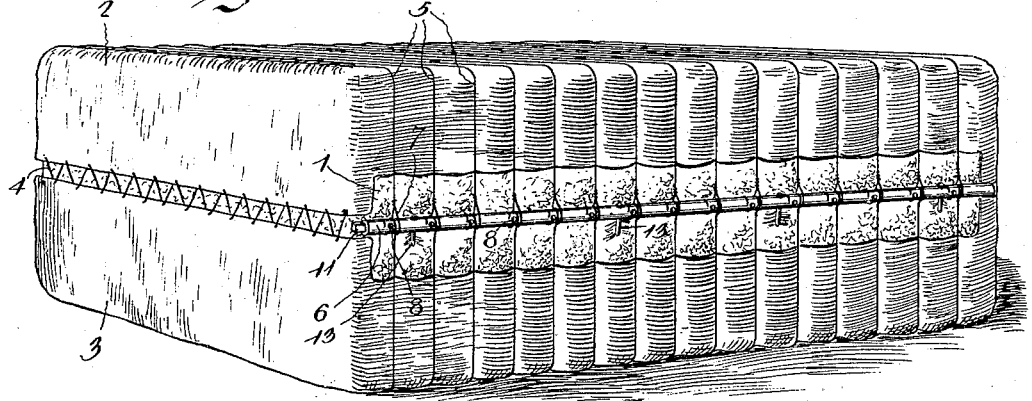
Witnesses
Walter T. Forbes, Inventor.
By his Attorneys,
C A Snow & Co.

UNITED STATES PATENT OFFICE.

WALTER T. FORBES, OF ATLANTA, GEORGIA.

BALE-TIE.

SPECIFICATION forming part of Letters Patent No. 653,226, dated July 10, 1900.

Application filed October 9, 1899. Serial No. 733,028. (No model.)

*To all whom it may concern:*

Be it known that I, WALTER T. FORBES, a citizen of the United States, residing at Atlanta, in the county of Fulton and State of Georgia, have invented a new and useful Bale-Tie, of which the following is a specification.

My invention relates to cotton or other bale-ties; and its object is the production of a simple and convenient bale-tie capable of being tightened while the bale is in the compress under compression.

The invention consists in providing a series of ties with a common tightening device by means of which they may be tightened simultaneously to resist the expansion which at present invariably increases the bulk of the bale to a considerable extent after it is removed from the compress.

Referring to the drawings, Figure 1 is a perspective view of a bale provided with my tie. Fig. 2 is a detail view showing the manner of connecting one of the ties to the coiling-tube. Fig. 3 is a detail view of the coiling-tube shown in Fig. 1. Fig. 4 is a similar view of the key which I employ for operating said tube. Fig. 5 is a fragmentary perspective view illustrating the application of a modified form of my tie, the essential variation being the employment of straps in lieu of wires. Fig. 6 is a detail view similar to Fig. 2, illustrating the manner of attaching one of the tie-straps shown in Fig. 5. Fig. 7 is a detail view of the coiling-tube shown in Fig. 5. Fig. 8 is a detail view of the key for actuating the tube shown in Fig. 7.

Like numerals of reference designate corresponding parts in all the figures of the drawings.

1 designates what is known as a "compressed" bale of cotton having its sides and a portion of its edges covered by the upper and lower bale-sheets 2 and 3, united at the ends by lacing 4.

5 5 indicate a series of ties passing entirely around the bale transversely in substantially parallel relation and designed when tightened to prevent the expansion of the bale after it leaves the compress, the primary consideration being the compression of the bale into the smallest possible space to facilitate its transportation.

Heretofore it has not been practical to take up all the slack of the bands, as there must be sufficient space or play to loop and buckle them together.

The numeral 6 indicates what may be termed a "coiling tube or shaft" extending along one side edge of the bale and passing through terminal loops 7, provided at one end of each of the ties, whereby the shaft is journaled on the latter. The opposite end of each tie having been passed around the bale is now brought up and is passed over the tube 6, thence through diametrical openings 8 therein, and is finally passed around the tube in the opposite direction. The end of each of the ties having thus been securely connected to the tube, the latter is rotated in any suitable manner, preferably by the application of the key 9, provided with a squared socket 10 to the terminal key-lug 11 at one end of the tube. As the tube is rotated freely within the loops 7 it gradually winds or coils the ends of the ties opposite the loops, causing the simultaneous binding of the bale throughout its length.

Any suitable means may be employed for preventing the backward rotation of the tube when pressure is removed from the key; but I prefer to provide a number of diametrical apertures 12, by means of which locking-pins 13 may be passed through the tube and, bearing against the side of the bale, act as stops or locking devices to prevent the uncoiling of the ties under the expansive force exerted when pressure is removed from the bale.

In the last four figures of the drawings I have illustrated a modification of the invention just described, which modification consists in substituting flat metal straps for the wire ties illustrated in connection with the preceding figures, the straps necessitating the employment of elongated slots 14 in the tube, diametrically disposed and designed, like the apertures 8, for the reception of the ties 15, which, however, in this latter embodiment of the invention are passed through the slots and then, instead of being coiled upon the tube in the reverse direction, are coiled up over the tube and under the portion of the tie rising from the lower edge of the bale. In connection with this embodiment of the invention I have also illustrated a variation of the key, which consists in slitting the end of the tube, as indicated at 16, and in providing the key 17 with a lug 18, designed to fit into the slitted portion. The broad novelty in my invention resides, however, in the provision of a tightening device designed to be incorporated as a permanent part of the tie and to act simultaneously upon the several ties constituting the binding for the bale.

What I claim is—

1. A bale-tie comprising a plurality of ties, a shaft connecting the ends of the ties and provided at one end with means for engaging a wrench or key, whereby it is adapted to be rotated to tighten the ties, said shaft being provided between its ends with an opening, and a removable locking device passing through the said opening and arranged to engage a bale, whereby the shaft is held against retrograde rotation, substantially as described.

2. A bale-tie comprising a plurality of ties, a shaft journaled on the ties at one end thereof and receiving and adapted to wind the other end of the ties, whereby the latter are simultaneously tightened, and a locking device, substantially as described.

3. A bale-tie comprising a plurality of ties, a shaft connected with and adapted to rotate independently of one end of each tie, and provided with openings for the reception of the other end of each tie, whereby the ties are connected to it adjustably, and means for locking the shaft, substantially as described.

4. A bale tie or binding comprising a plurality of flexible ties provided with terminal loops, a tube passed through the said loops and provided with diametrical openings for the reception of the opposite ends of the ties, and a suitable device for preventing retrograde movement of the tube.

5. In a bale tie or binding, the combination with a tube provided with transverse apertures, of a plurality of ties provided with terminal loops surrounding the tube and having their opposite ends passed through the apertures therein, detachable locking-pins projecting from the tube, and means for applying power to the tube to effect its rotation and the coiling of one end of each of the ties.

In testimony that I claim the foregoing as my own I have hereto affixed my signature in the presence of two witnesses.

WALTER T. FORBES.

Witnesses:
   H. C. BURGE,
   L. D. BURNS.